(12) United States Patent
Desai et al.

(10) Patent No.: US 11,817,803 B2
(45) Date of Patent: Nov. 14, 2023

(54) METHODS AND SYSTEMS FOR DETECTING A WINDING RESISTANCE AND WINDING TEMPERATURE OF AN ALTERNATING CURRENT ELECTRICAL MACHINE

(71) Applicant: American Axle & Manufacturing, Inc., Detroit, MI (US)

(72) Inventors: Tejas Desai, Troy, MI (US); Robert S. Kleinhardt, Romeo, MI (US); Yida Yang, Lasalle (CA); Claudio Bruning, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 4 days.

(21) Appl. No.: 17/735,576

(22) Filed: May 3, 2022

(65) Prior Publication Data

US 2022/0263443 A1 Aug. 18, 2022

Related U.S. Application Data

(63) Continuation-in-part of application No. PCT/US2021/059486, filed on Nov. 16, 2021.

(60) Provisional application No. 63/140,579, filed on Jan. 22, 2021.

(51) Int. Cl.
*H02P 21/14* (2016.01)
*H02P 25/18* (2006.01)
*H02P 27/08* (2006.01)

(52) U.S. Cl.
CPC ............ *H02P 21/14* (2013.01); *H02P 25/182* (2013.01); *H02P 27/08* (2013.01)

(58) Field of Classification Search
CPC .......... H02P 29/64; H02P 29/66; H02P 29/67; H02P 29/68; H02P 29/62; H02P 29/60;
(Continued)

(56) References Cited

U.S. PATENT DOCUMENTS 8,138,697 B2 3/2012 Palma
8,384,338 B2 2/2013 Lu et al.
(Continued)

FOREIGN PATENT DOCUMENTS

CN 107294457 B 8/2019
EP 1755211 A1 2/2007
(Continued)

OTHER PUBLICATIONS

S.D. Wilson et al.; "Real-Time Thermal Management of Permanent Magnet Synchronous Motors by Resistance Estimation". IET Electric Power Application. pp. 1-11, Nov. 2012 [retrieved on Feb. 21, 2022], Retrieved from <https://www.researchgate.net/publication/262600092> <DOI:10.1049/iet-epa.2010.0232>. pp. 1-7; and figures 1, 3.
(Continued)

*Primary Examiner* — Antony M Paul
(74) *Attorney, Agent, or Firm* — Reising Ethington P.C.

(57) ABSTRACT

A method includes determining a vector state of an alternating current (AC) electrical machine. The method includes, when the vector state is a zero-vector state, obtaining a plurality of phase current samples of the AC electrical machine, determining a decay time constant based on the plurality of phase current samples, and determining a resistance of a winding of the AC electrical machine based on the decay time constant. The method further includes selectively activating a plurality of switches of an inverter configured to provide power to the AC electrical machine based at least on the resistance of the winding of the AC electrical machine.

20 Claims, 5 Drawing Sheets

(58) Field of Classification Search
CPC ...... H02P 21/00; H02P 21/0003; H02P 21/14;
H02P 21/16; H02P 21/22; H02P 21/50;
H02P 21/24; H02P 23/00; H02P 23/0004;
H02P 23/07; H02P 23/14; H02P 25/062;
H02P 25/064; H02P 25/089; H02P 27/04;
H02P 27/06; H02P 27/08; H02P 27/00;
H02P 7/29; H02P 7/00; H02P 1/00; H02P
1/04; H02P 1/24; H02P 1/26; H02P 1/42;
H02P 1/46

See application file for complete search history.

(56) References Cited

U.S. PATENT DOCUMENTS

2003/0173946 A1    9/2003  Liu et al.
2014/0152202 A1    6/2014  Tazawa et al.

FOREIGN PATENT DOCUMENTS

EP    2270522 A1 *  1/2011    .............. H02P 21/14
KR    101450481     10/2014

OTHER PUBLICATIONS

PCT International Search Report dated Mar. 10, 2022 for corresponding PCT application No. PCT/US2021/059486, filed Nov. 16, 2021.

* cited by examiner

METHODS AND SYSTEMS FOR DETECTING A WINDING RESISTANCE AND WINDING TEMPERATURE OF AN ALTERNATING CURRENT ELECTRICAL MACHINE

CROSS-REFERENCE TO RELATED APPLICATIONS

This application is a bypass continuation-in-part of International Patent Application PCT/US2021/059486 filed Nov. 16, 2021, which claims the benefit of U.S. Provisional Application No. 63/140,579 filed Jan. 22, 2021. The disclosures of each of the above-referenced applications is incorporated by reference as fully set forth in detail herein.

FIELD

The present disclosure relates to systems and methods for detecting a winding resistance and winding temperature of an alternating current (AC) electrical machine.

BACKGROUND

The statements in this section merely provide background information related to the present disclosure and may not constitute prior art.

AC electrical or electric machines provide electric power to various components and systems, such as a hybrid electric vehicle (HEV), an electric vehicle (EV), and the like. A controller communicably coupled to the AC electric machine may obtain performance data from one or more sensors of the AC electric machine to evaluate various performance characteristics of the AC electric machine. As an example, the controller may inject currents into the various phases of the AC electric machines, obtain temperature data from a temperature sensor, and determine a temperature and/or resistance of a winding of a permanent magnet synchronous motor (PMSM) based on the temperature data. Furthermore, the controller may perform field-oriented control routines based on the determined resistance and/or temperature of the winding.

However, temperature sensors may increase the size of the AC electric machine and the complexity of the controller logic needed to process the sensor data.

SUMMARY

This section provides a general summary of the disclosure and is not a comprehensive disclosure of its full scope or all of its features.

The present disclosure provides a method including determining a vector state of an alternating current (AC) electrical machine. The method includes, when the vector state is a zero-vector state, obtaining a plurality of phase current samples of the AC electrical machine, determining a decay time constant based on the plurality of phase current samples, and determining a resistance of a winding of the AC electrical machine based on the decay time constant. The method further includes selectively activating a plurality of switches of an inverter configured to provide power to the AC electrical machine based at least on the resistance of the winding of the AC electrical machine.

In some forms, the vector state is determined based on a plurality of switches of an inverter.

In some forms, the vector state is the zero-vector state when each of the plurality of switches and a power supply collectively form a short circuit.

In some forms, the vector state is the zero-vector state when the AC electrical machine operates at a steady state stall condition.

In some forms, the method further includes controlling the AC electrical machine based on a space vector pulse width modulation routine.

In some forms, the decay time constant is determined based on a first current magnitude of a first phase current sample of the plurality of phase current samples and a second current magnitude of a second phase current sample of the plurality of phase current samples.

In some forms, the decay time constant is determined based on a difference between a first natural log of the first current magnitude and a second natural log of the second current magnitude.

In some forms, the decay time constant is determined based on a first timestamp of a first phase current sample of the plurality of phase current samples and a second timestamp of a second phase current sample of the plurality of phase current samples.

In some forms, the decay time constant is determined based on a difference between the first timestamp and the second timestamp.

In some forms, the resistance is determined based on a baseline inductance of the winding.

In some forms, the method further includes determining a temperature of the winding based on the resistance.

In some forms, the temperature is determined based on a baseline resistance of the winding and a temperature coefficient of resistance of the winding.

The present disclosure provides a system including a processor and a nontransitory computer-readable medium including instructions that are executable by the processor. The instructions include determining a vector state of an alternating current (AC) electrical machine. The instructions include, when the vector state is a zero-vector state, obtaining a plurality of phase current samples of the AC electrical machine, determining a decay time constant based on the plurality of phase current samples, and determining a resistance of a winding of the AC electrical machine based on the decay time constant. The instructions further include selectively controlling a plurality of switches of an inverter configured to provide power to the AC electrical machine based at least on the resistance of the winding of the AC electrical machine.

In some forms, the vector state is determined based on a plurality of switches of an inverter communicably coupled to the processor.

In some forms, the vector state is the zero-vector state when each of the plurality of switches and a power supply collectively form a short circuit.

In some forms, the vector state is the zero-vector state when the AC electrical machine operates at a steady state stall condition.

In some forms, the decay time constant is determined based on a first current magnitude of a first phase current sample of the plurality of phase current samples and a second current magnitude of a second phase current sample of the plurality of phase current samples.

In some forms, the decay time constant is determined based on a first timestamp of the first phase current sample and a second timestamp of the second phase current sample.

In some forms, the decay time constant is determined based on a difference between a first natural log of the first current magnitude and a second natural log of the second current magnitude and a difference between the first timestamp and the second timestamp.

The present disclosure provides a method including determining a vector state of an alternating current (AC) electrical machine, where the vector state is one of a zero-vector state and a nonzero-vector state. The method includes, when the vector state is in the nonzero-vector state: obtaining a plurality of phase current samples of the AC electrical machine, determining a rise time constant based on the plurality of phase current samples, and determining a resistance of a winding of the AC electrical machine based on the rise time constant. The method further includes selectively activating a plurality of switches of an inverter configured to provide power to the AC electrical machine based at least on the resistance of the winding of the AC electrical machine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
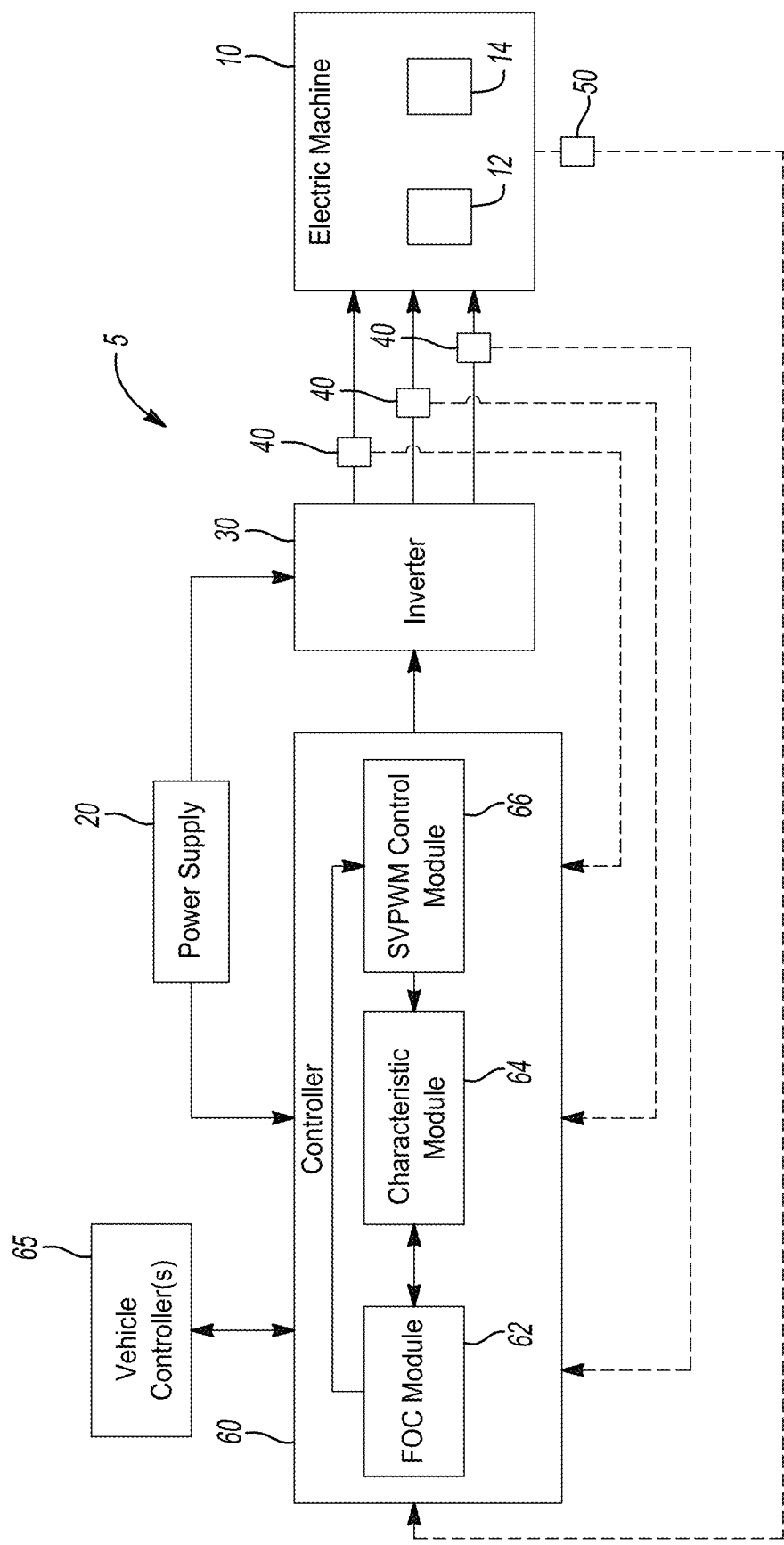
FIG. 1A is a block diagram of an example vehicle according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a system that determines a resistance and/or temperature of one or more windings of an AC electric machine based on one or more instantaneous current measurements obtained during a zero-vector state of a space vector pulse width modulation routine. As described herein in further detail, the one or more instantaneous current measurements obtained during the zero-vector state enables a controller to determine or estimate the resistance and/or temperature of one or more windings without the use of additional temperature/resistance sensors, thereby reducing the size of the AC electric machine and the complexity of the controller logic needed to process the sensor data. The resistance and/or temperature of one or more windings of the AC electric machine may collectively be referred to as winding state characteristics.

With reference to FIG. 1A, vehicle 5 is shown. The vehicle 5 includes an AC electric machine 10, a power supply 20, an inverter 30, phase current sensors 40, a rotor sensor 50, and a controller 60. It should be understood that the vehicle 5 includes various other components and is not limited to the components described herein.

In one form, the AC electric machine 10 is a three-phase electric motor configured to produce a torque required to drive a load, such as a ball ramp clutch assembly. Example AC electric machines 10 include, but are not limited to, a synchronous electrical machine (e.g., a PMSM), an asynchronous electrical machine, a salient electrical machine, a non-salient electrical machine, among others. It should be understood that the AC electric machine 10 may be various types of AC electrical machines and is not limited to the examples described herein. In one form, the AC electric machine 10 may include includes windings 12 (e.g., three sets of windings corresponding to the three phases of the AC electric machine 10) and a rotor 14. While the AC electric machine 10 is illustrated as including the windings 12 and the rotor 14, it should be understood that the AC electric machine 10 may include various other components not illustrated herein. In one variation, the AC electric machine 10 may be replaced with a direct-current (DC) electric machine configured to produce a torque required to drive the load.

In one form, the power supply 20 is configured to provide electrical power to various components of the vehicle 5, such as the inverter 30 and the controller 60. As an example, the power supply 20 includes a direct current (DC) power source (e.g., one or more batteries) configured to provide DC electrical power. As another example, the power supply 20 includes an AC power source and a rectifier circuit configured to provide the DC electrical power.

Figure 1B:
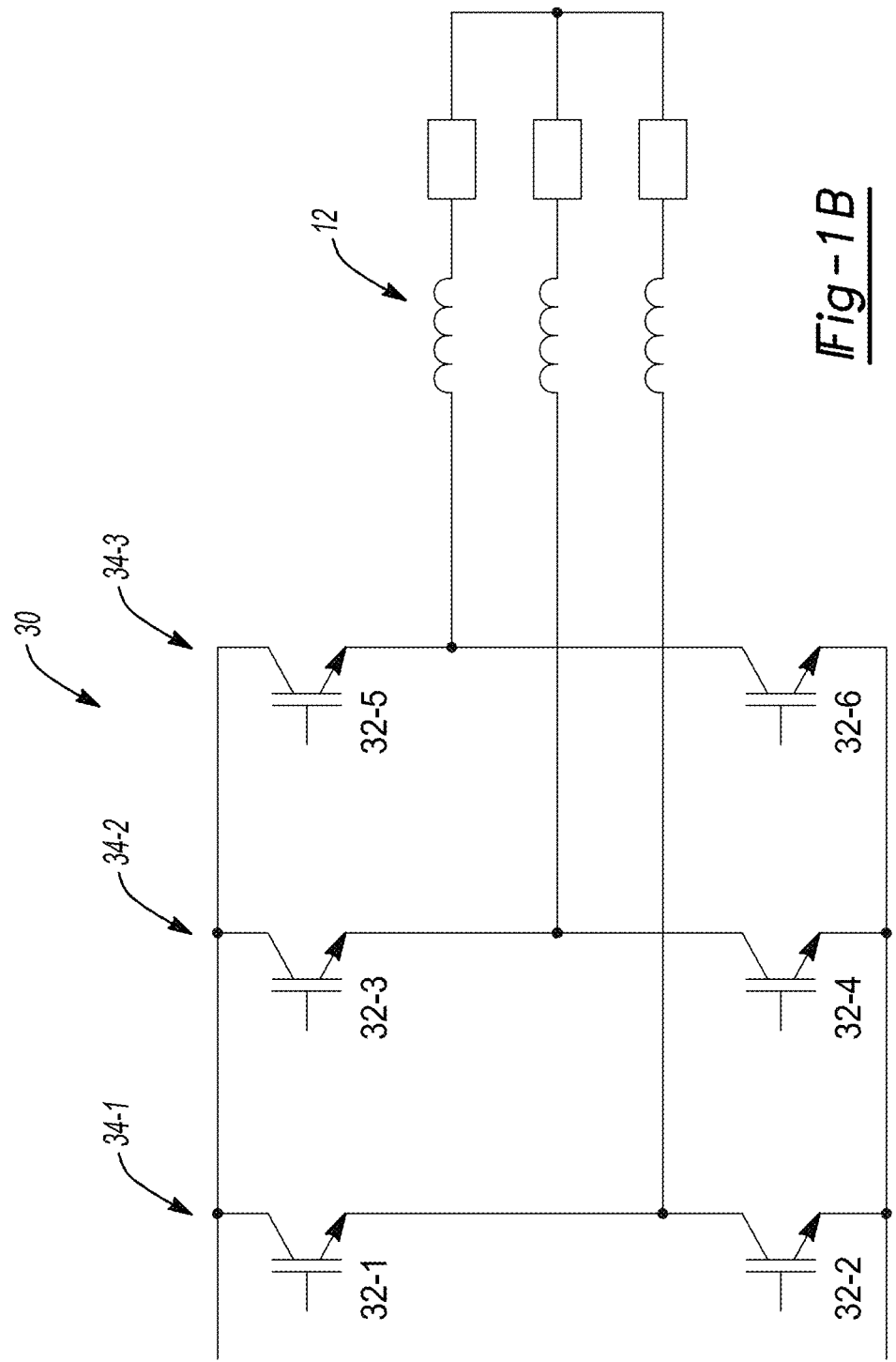
FIG. 1B is a block diagram of an inverter according to the teachings of the present disclosure.

In one form, the inverter 30 includes one or more circuits configured to convert electrical power from the power supply 20 into a three-phase AC electrical signal and provide the three-phase AC electrical signal to the AC electric machine 10. As an example and as shown in FIG. 1B, the inverter 30 may be a three-phase voltage source inverter circuit that includes six switches 32-1, 32-2, 32-3, 32-4, 32-5, 32-6 (collectively referred to as the switches 32) and three legs 34-1, 34-2, 34-3 (collectively referred to as legs 34). Example switches 32 include, but are not limited to, a bipolar junction transistor (BJT), an insulated gate bipolar transistor (IGBT), a metal-oxide semiconductor field-effect transistor (MOSFET), and/or the like. In one form, each of the legs 34 is electrically coupled to one of the windings 12 of the AC electric machine 10. It should be understood that the inverter 30 may include various discrete and/or integrated circuits that output the three-phase AC electrical signal and is not limited to the examples described herein. It should also be understood that the inverter 30 may be implemented by various other inverters in other forms including, but not limited to, a single-phase inverter, a two-level voltage source inverter, a multilevel inverter, among others.

In one form and referring back to FIG. 1A, the phase current sensors 40 are configured to generate information representing a current magnitude of the AC electrical signal provided to the windings 12 of the AC electric machine 10 by the inverter 30. As an example, the phase current sensors 40 may be a Hall effect sensor, a transformer, a current clamp meter, a fiber optic current sensor, and the like. In some forms, the number of phase current sensors 40 may be equal to the number of phases of the AC electric machine 10. The rotor sensor 50 is configured to generate information representing a speed and/or angular position of the rotor 14. As an example, the rotor sensor 50 may be an encoder, an electromagnetic resolver, and the like.

In one form, the controller 60 may include various hardware components, such as transceivers, routers, input/output ports, among other hardware components, to perform the functionality described herein. In some variations, the controller 60 is configured to communicate with other vehicle controllers 65 within the vehicle 5 via a vehicle communication network (not shown). The vehicle controllers 65 may include, but are not limited to: a transmission controller, a driveline controller, and/or a diagnostic controller. In one form, the controller 60 may include a field-oriented control (FOC) module 62, a characteristic module 64, and a space vector pulse width modulation (SVPWM) control module 66 that are implemented by one or more processors configured to execute instructions stored in a nontransitory computer-readable medium, such as a random-access memory (RAM) and/or a read-only memory (ROM).

In one form, the FOC module 62 is configured to determine stationary reference frame voltage magnitudes based on the current obtained from the phase current sensors 40. The SVPWM control module 66 is configured to control the switches 32 based on the stationary reference frame voltage magnitudes determined by the FOC module 62 and thereby control the operation of the AC electric machine 10. The characteristic module 64 is configured to selectively obtain the current data from the phase current sensors 40 based on the state of the switches 32 and determine a winding state characteristic, which may include the resistance and/or temperature of the windings 12 based on the sensor data. Additional details of the functionality of the FOC module 62, the characteristic module 64, and the SVPWM control module 66 are described below with reference to FIGS. 2A-2B.

Figure 2A:
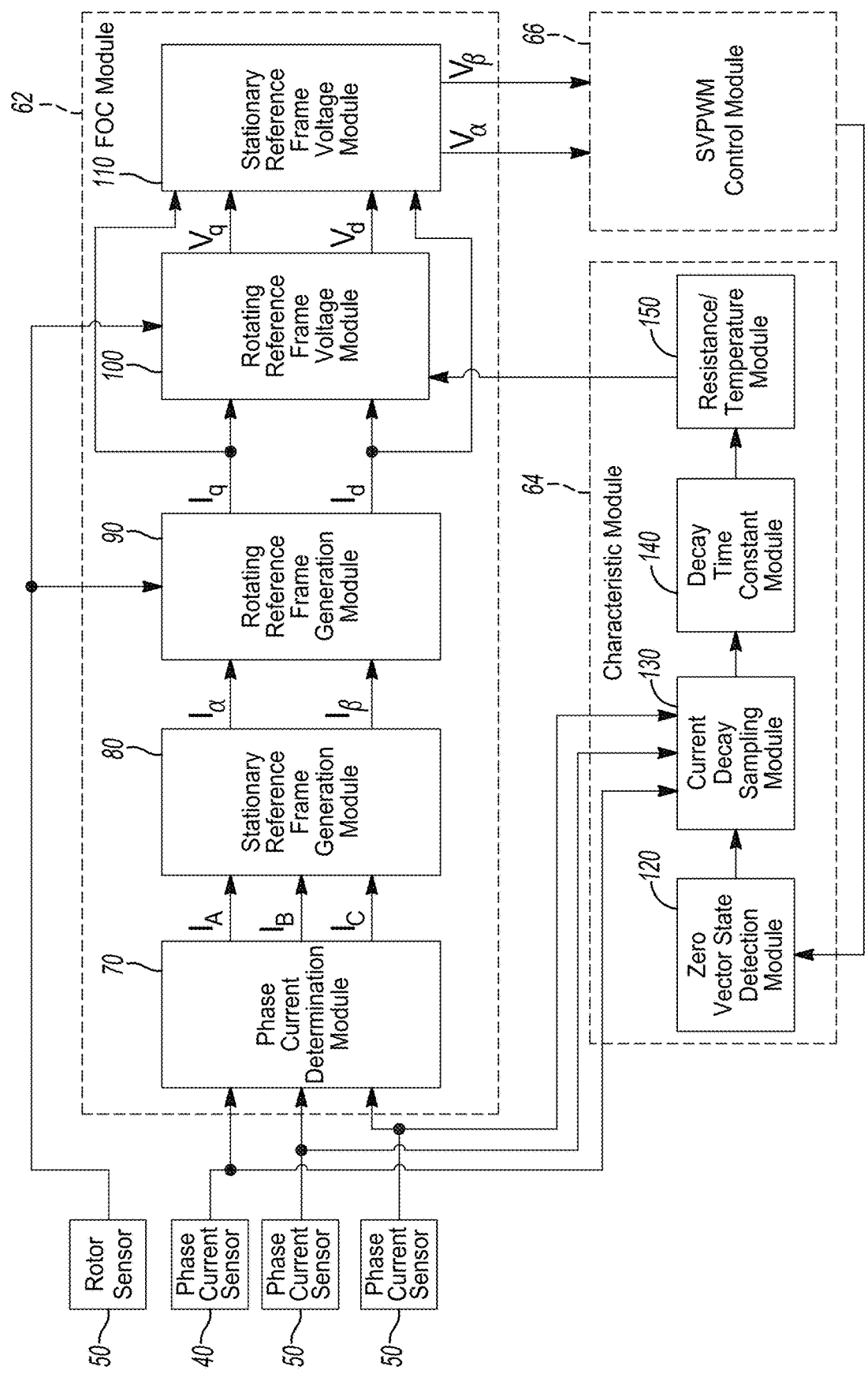
FIG. 2A is a block diagram of a system for determining a winding resistance and winding temperature according to the teachings of the present disclosure.

Referring to FIG. 2A, an example functional block diagram of the FOC module 62, the characteristic module 64, and the SVPWM control module 66 is shown. In one form, the FOC module 62 includes a phase current determination module (PCDM) 70, a stationary reference frame generation module (SRFGM) 80, a rotating reference frame generation module (RRFGM) 90, a rotating reference frame voltage module (RRFVM) 100, and a stationary reference frame voltage module (SRFVM) 110.

In some forms, the PCDM 70 determines the magnitude of the phase current of each winding 12 ($I_A$, $I_B$, $I_C$) based on the sensor data obtained from the phase current sensors 40.

In one form, the SRFGM 80 converts the phase currents of each winding 12 ($I_A$, $I_B$, $I_C$) into a two-axis stationary reference frame representation of the phase currents, such as the stationary axis quadrature axes frame (i.e., the αβ-frame). As an example, the SRFGM 80 may convert the phase currents ($I_A$, $I_B$, $I_C$) into the αβ-frame ($I_\alpha$, $I_\beta$) by performing a Clarke transform, as indicated by the following relations:

$$I_\alpha = \frac{2}{3}I_A - \frac{1}{3}(I_B - I_C) \quad (1)$$

$$I_\beta = \frac{2}{\sqrt{3}}(I_B - I_C) \quad (2)$$

In one form, the RRFGM 90 converts the αβ-frame representation of the phase currents ($I_\alpha$, $I_\beta$) into a two-axis rotating reference frame representation of the phase currents, such as the direct-quadrature-zero frame (i.e., the dq-frame). As an example, the RRFGM 90 converts the αβ-frame representation of the phase currents ($I_\alpha$, $I_\beta$) into the dq-frame ($I_q$, $I_d$) by performing a Park transform, as indicated by the following relations:

$$I_d = I_\alpha \cos\theta + I_\beta \sin\theta \quad (3)$$

$$I_q = -I_\alpha \sin\theta + I_\beta \cos\theta \quad (4)$$

In relations (3) and (4), $I_d$ is the d-axis phase current, $I_q$ is the q-axis phase current, and θ is the rotational angle in which the dq-frame is rotated from the αβ-frame and is based on the angular position obtained from the rotor sensor 50.

In one form, The RRFVM 100 determines a dq-frame representation of the phase voltages ($V_q$, $V_d$) based on the dq-frame phase currents ($I_q$, $I_d$) and reference dq-frame phase currents ($I_q^*$, $I_d^*$). In one form, the RRFVM 100 may be implemented by a proportional-integral (PI) controller. The RRFVM 100 may determine the reference dq-frame phase currents ($I_q^*$, $I_d^*$) based at least on a speed of the rotor 14 (as indicated by the rotor sensor 50), a difference between a torque command and a torque of the rotor 14 (as indicated by the phase current sensors 40), and the winding state characteristic. It should be understood that the reference dq-frame phase currents ($I_q^*$, $I_d^*$) may be determined based on the current flux of the windings 12 in other forms. Accordingly, the RRFVM 100 may determine the dq-frame phase voltages ($V_q$, $V_d$) based on a difference between the dq-frame phase currents ($I_q$, $I_d$) and the reference dq-frame phase currents ($I_q^*$, $I_d^*$), a proportional, an integral constant, and an integration routine performed by the PI controller.

In some forms, the RRFVM 100 may be configured to perform a remedial action when the winding state characteristic indicates a temperature of the one or more windings is greater than or equal to threshold. Specifically and as described below, the RRFVM 100 may receive data from the characteristic module 64 indicating that the winding state characteristic is greater than or equal to a defined threshold. To reduce or inhibit further increase in the winding state characteristic, the RRFVM 110 is configured to, as the remedial action, determine the dq-frame phase voltages ($V_q$, $V_d$) using a set of algorithms that reduce power to the one or more windings. For example, dq-frame phase voltages may be selected to reduce a time period the switches 32 are activated by the SVPWM control module 66.

In one form, the SRFVM 110 converts the dq-frame representation of the phase voltages ($V_q$, $V_d$) into an αβ-frame representation of the phase voltages ($V_\alpha$, $V_\beta$). As an example, the SRFVM 110 performs an inverse Park transform to obtain the αβ-frame of the phase voltages ($V_\alpha$, $V_\beta$), as shown by the following relations:

$$V_\alpha = V_d \cos\theta - V_q \sin\theta \quad (5)$$

$$V_\beta = V_d \sin\theta + V_q \cos\theta \quad (6)$$

In relations (5) and (6), θ is the rotational angle in which the dq-frame is rotated from the αβ-frame and is based on the angular position obtained from the rotor sensor 50.

The SVPWM control module 66 is configured to selectively control the voltage magnitude and/or the frequency of the three-phase AC electrical signal provided to the AC electric machine 10 based on the αβ-frame representation of the phase voltages ($V_\alpha$, $V_\beta$, hereinafter referred to as "the reference signal"). In one form, to control the voltage magnitude and/or frequency of the signal provided to the AC electric machine 10, the SVPWM control module 66 selectively activates the switches 32 of the inverter 30 based on the reference signal and a vector state diagram. To selectively activate the switches 32, the SVPWM control module 66 is configured to selectively provide a biasing voltage to the switches 32 and thereby turn the switches 32 on or off.

Figure 2B:
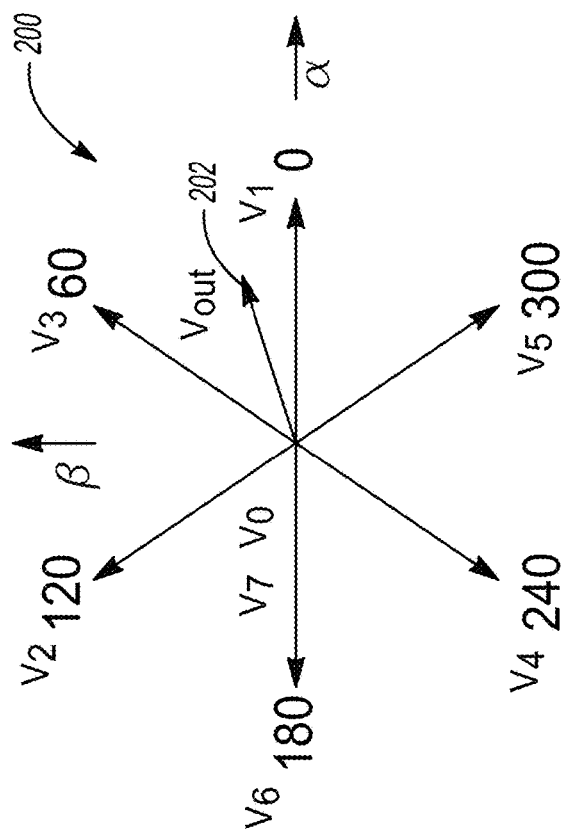
FIG. 2B is a vector state diagram of a space vector pulse width modulation control routine according to the teachings of the present disclosure.

As an example and with reference to FIG. 2B, vector state diagram 200 with vector states ($V_0$-$V_7$) and reference signal 202 are shown. The vector states ($V_0$-$V_7$) correspond to the state of the switches 32 of the inverter 30 and may be one of a zero-vector state or a non-zero-vector state (a first vector state, a second vector state, . . . , and a sixth vector state). As an example and referring to FIGS. 1B and 2B, a zero-vector state ($V_0$) corresponds to switches 32-4, 32-5, 32-6 being turned on and switches 32-1, 32-2, 32-3 being turned off (i.e., the windings 12 are short-circuited, the AC electric machine 10 is operating at steady state stall, etc.). Another zero-vector state ($V_7$) corresponds to switches 32-1, 32-2, 32-3 being turned on and switches 32-4, 32-5, 32-6 being turned off.

As another example, a first vector state ($V_1$) may correspond to switches 32-1, 32-5, 32-6 being turned on and switches 32-2, 32-3, 32-4 being turned off. A second vector state ($V_2$) may correspond to switches 32-1, 32-2, 32-6 being turned on and switches 32-3, 32-4, 32-5 being turned off. A third vector state ($V_3$) may correspond to switches 32-2, 32-4, 32-6 being turned on and switches 32-1, 32-3, 32-5 being turned off. A fourth vector state ($V_4$) may correspond to switches 32-2, 32-3, 32-4 being turned on and switches 32-1, 32-5, 32-6 being turned off. A fifth vector state ($V_5$) may correspond to switches 32-3, 32-4, 32-5 being turned on and switches 32-1, 32-2, 32-6 being turned off. A sixth vector state ($V_6$) may correspond to switches 32-1, 32-3, 32-5 being turned on and switches 32-2, 32-4, 32-6 being turned off. It should be understood that the nonzero-vector states may have varying combinations of the switch states and is not limited to the examples described herein.

The SVPWM control module 66 is configured to selectively activate the switches 32 based on the location of the reference signal 202 on the vector state diagram 200. As an example, if the reference signal 202 is located between the first vector state ($V_1$) and the third vector state ($V_3$), the SVPWM control module 66 activates the switches 32 for a first period of time in accordance with the first vector state ($V_1$) and a second period of time in accordance with the third vector state ($V_3$). As such, a resulting vector based on the first and second time periods in the first vector state ($V_1$) and the third vector state ($V_3$), respectively, is equal to the reference signal 202.

Referring back to FIG. 2A, the characteristic module 64 may include a zero-vector state detection module (ZVSDM) 120, a current decay sampling module (CDSM) 130, a decay time constant module (DTCM) 140, and a resistance/temperature module (RTM) 150.

The ZVSDM 120 is configured to detect the vector states of the switches 32 as indicated by the SVPWM control module 66. As an example, the ZVSDM 120 is configured to determine whether the switches 32 are in the zero-vector state or one of the non-zero-vector states.

In response to the ZVSDM 120 determining that the switches 32 are in the zero-vector state, the CDSM 130 obtains a plurality of instantaneous phase current samples of the windings 12 as the current decays during steady state stall operation of the AC electric machine 10. In one form, each of the windings 12 can be represented as resistor-inductor (RL) circuit during steady state stall operation of the AC electric machine 10. As such, the instantaneous phase current samples can be determined based on the following relations:

$$i_1(t) = I_0 e^{\frac{-t_1}{\tau}} \quad (7)$$

$$i_2(t) = I_0 e^{\frac{-t_2}{\tau}} \quad (8)$$

$$\tau = \frac{L_s}{R_s} \quad (9)$$

In relations (7), (8), and (9), $i_1(t)$ is the magnitude of a first instantaneous phase current sample, $i_2(t)$ is the magnitude of a second instantaneous phase current sample, $t_1$ is a timestamp of the first instantaneous phase current sample, $t_2$ is a timestamp of the second instantaneous phase current sample, $R_s$ is the resistance of the winding 12, $L_s$ is the inductance of the winding 12, $I_0$ is a steady state current that is based on a voltage of the windings 12 the resistance of the winding ($R_s$), and $\tau$ is a decay time constant of the windings 12.

In one form, the DTCM 140 is configured to determine the decay time constant of the windings 12. The DTCM 140 may determine the decay time constant based on a natural log of the magnitudes of the first and second instantaneous phase current samples and a difference between the timestamps of the first and second instantaneous phase current samples. More specifically, the DTCM 140 may divide the magnitude of the first instantaneous phase current sample by the magnitude of the second instantaneous phase current sample to determine the decay time constant ($\tau$), as shown in the below relation:

$$\tau = \frac{t_2 - t_1}{\ln\left[\frac{i_1(t)}{i_2(t)}\right]} \quad (10)$$

In one form, the RTM 150 is configured to determine a resistance of the winding 12 based on the decay time constant. Since the inductance of the winding 12 ($L_s$) is invariant to temperature, the resistance of the winding 12 ($R_s$) can be determined based on a baseline inductance of the winding 12 ($L_0$) at a predefined temperature (e.g., room temperature), as shown in the following relation:

$$R_S = \frac{L_0}{\tau} \quad (11)$$

In one form, the RTM 150 is also configured to determine a temperature of the winding 12 based on the resistance of the winding 12 ($R_s$). The RTM 150 may determine the temperature (T) of the winding 12 using known resistance-to-temperature conversion relations, as shown in the following relation:

$$R_s = R_0[1 + C(T - T_0)] \quad (12)$$

In relation (12), $R_0$ is the resistance of the winding 12 ($R_s$) at a predefined temperature (e.g., room temperature), C is a temperature coefficient of resistance of the winding 12, and $T_0$ is the temperature of the winding 12 ($R_s$) at the predefined temperature (e.g., room temperature).

While FIGS. 2A-2B disclose the controller 60 being configured to determine the resistance and/or temperature of the winding 12 during the zero-vector state, it should be understood that the controller 60 may also determine the resistance and/or temperature of the winding 12 in the nonzero-vector state in other variations. As an example, in one form, in response to the ZVSDM 120 determining that the switches 32 are in the nonzero-vector state, the CDSM 130 obtains a plurality of instantaneous phase current samples of the windings 12 as the current rises using relations (7), (8), and (9). Subsequently, the DTCM 140 may determine a rise time constant of the windings 12 using relation (10), and the RTM 150 may determine the resistance and/or temperature of the winding 12 based on the rise time constant using relations (11) and/or (12).

In one form, the RTM 150 is further configured to determine whether the winding state characteristic of the windings 12 is greater than or equal to a defined threshold and have a remedial action performed to reduce or inhibit further increase of the winding state characteristic. For example, the RTM 150 is configured to determine if the temperature of the winding is greater than or equal to a defined temperature threshold. In another example, the RTM 150 is configured to determine if the resistance is greater than or equal to a defined resistance threshold. If the temperature is greater than or equal to the defined temperature threshold and/or if the resistance is greater than or equal to the defined resistance threshold, the RTM 150 is configured to have the FOC module 62 determine phase voltages that reduce power to the electric machine 10 by, for example, activation of the switches 32. Accordingly, the controller 60 is configured to control the electric machine 10 based at least on the determined winding state characteristic (i.e., resistance and/or temperature of the windings 12) via field-oriented control. In another example, the RTM 150 is configured to provide a signal indicating the winding characteristic is greater than or equal to the defined threshold to one or more of the vehicle controllers 65, so as to have one or more of the vehicle controllers 65 perform known remedial actions, such as but not limited to: having a cooling system of the electric machine 10 increase coolant flow to the electric machine 10; and/or setting a diagnostic flag indicative of a high temperature of the electric machine 10, which may further have the vehicle 5 placed in a "limp home" mode to, for example, reduce speed of the vehicle 5. It should be readily understood that while specific examples are provided, the RTM 150 may be configured to perform other actions to address the high resistance and/or high temperature of the windings 12.

Furthermore, while FIGS. 2A-2B disclose the controller 60 controlling the voltage magnitude and/or the frequency of the three-phase AC electrical signal provided using the SVPWM control module 66, it should be understood that other control routines may be performed in other variations. As an example, the SVPWM control module 66 of the controller 60 may be replaced with other modules configured to perform other field-oriented control routines, block commutation routines, sinusoidal commutation routines, trapezoidal commutation routines, and the like to selectively control the voltage magnitude and/or the frequency of the signal provided to the AC electric machine 10. As such, for the other control routines of the AC electric machine 10, the ZVSDM 120 of the controller 60 may determine whether the switches 32 are in the zero-vector state (i.e., when the switches 32-4, 32-5, 32-6 are turned on and the switches 32-1, 32-2, 32-3 are turned off, or when the switches 32-1, 32-2, 32-3 are turned on and the switches 32-4, 32-5, 32-6 are turned off) and the nonzero-vector state in a similar manner.

Figure 3A:
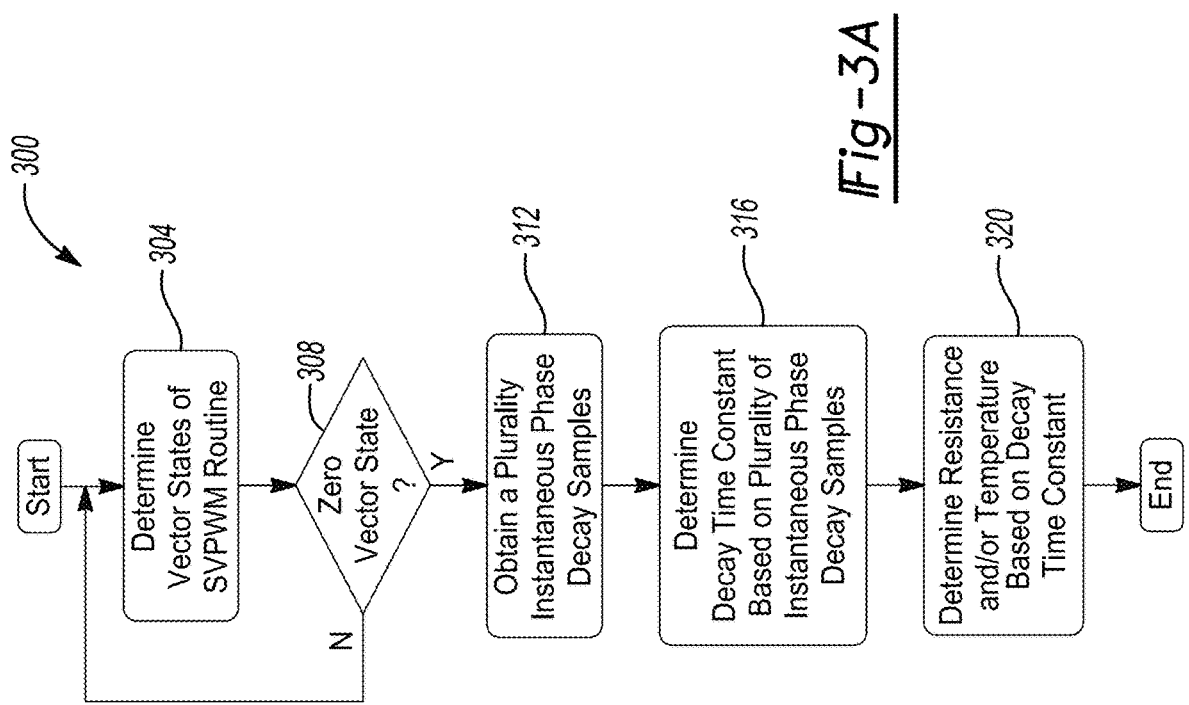
FIG. 3A is a flow chart for determining a rotor speed and a rotor position according to the teachings of the present disclosure.
Figure 3B:
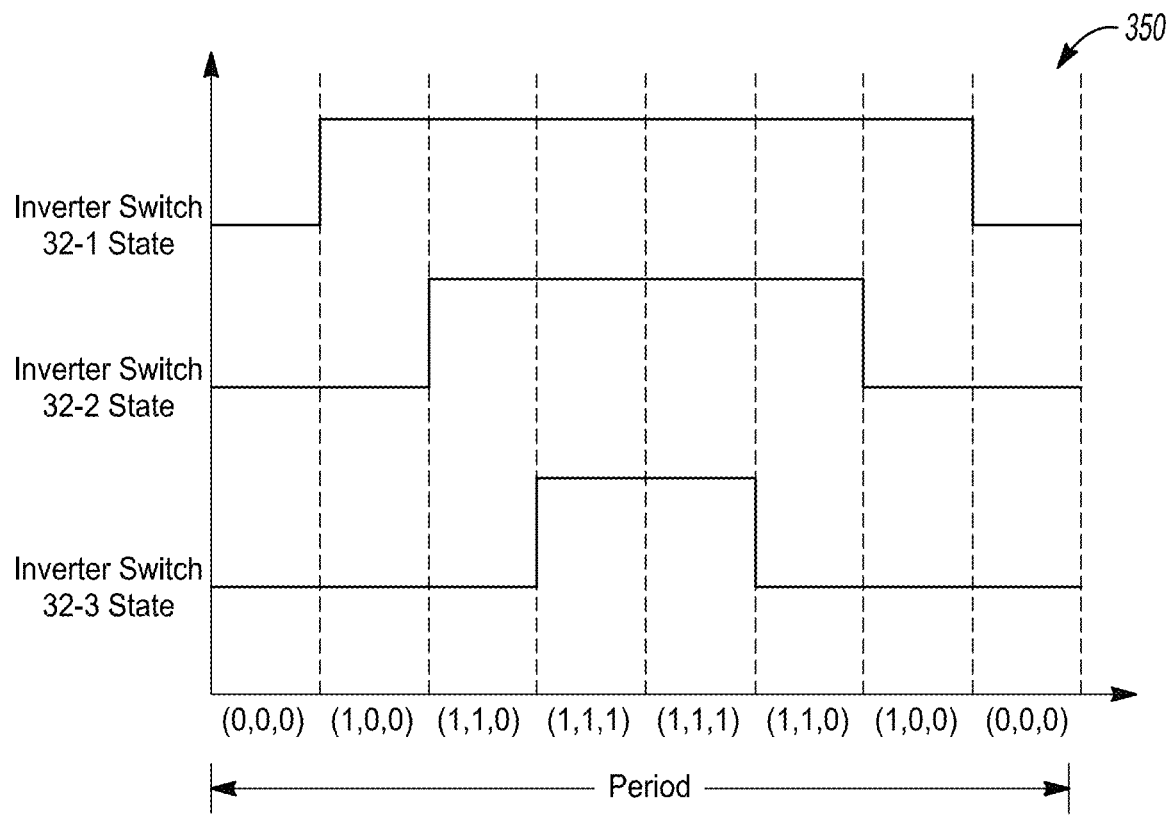
FIG. 3B is a graph of a space vector pulse width modulation control routine according to the teachings of the present disclosure.

With reference to FIG. 3A, a routine 300 for determining the resistance of the winding 12 is shown and performed by the controller 60. At 304, the controller 60 determines the vector state of the SVPWM routine. At 308, the controller 60 determines whether the SVPWM routine is in the zero-vector state. As an example and as described above, the SVPWM routine is in the zero-vector state if the switches 32-1, 32-2, 32-3 (or the switches 32-4, 32-5, 32-6) are collectively activated (e.g., time period (1, 1, 1) of SVPWM plot 350 shown in FIG. 3B) or collectively deactivated (e.g., time period (0, 0, 0) of the SVPWM plot 350). If the SVPWM routine is in the zero-vector state, the routine 300 proceeds to 312. Otherwise, if the SVPWM routine is not in the zero-vector state, the routine 300 proceeds to 304.

Figure 3C:
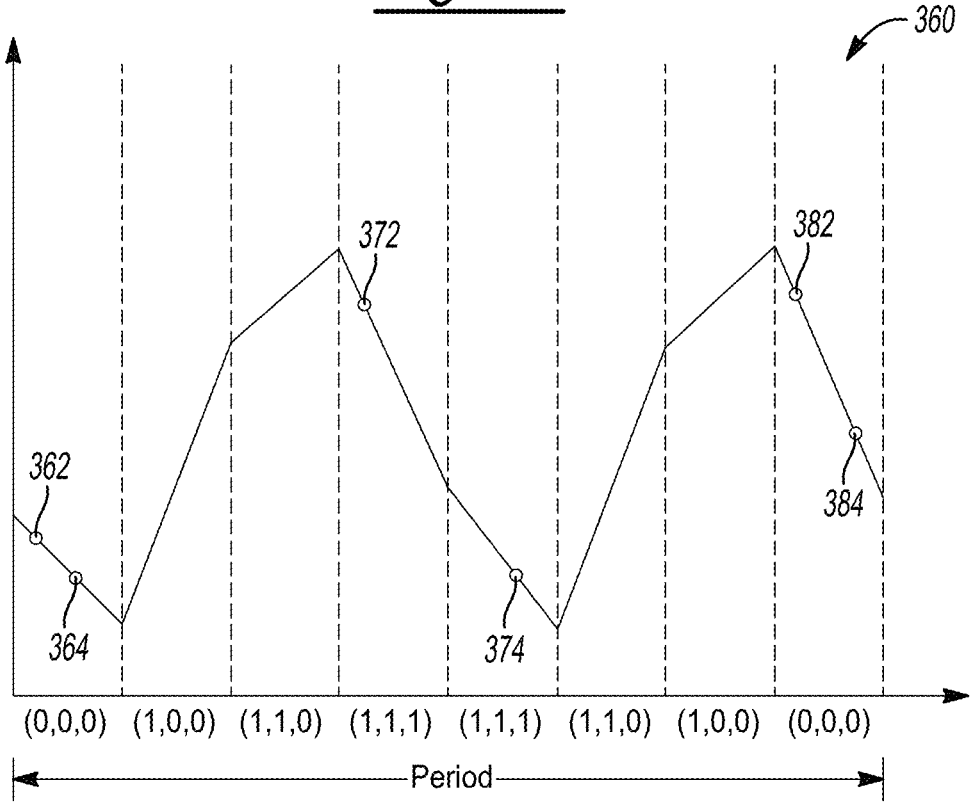
FIG. 3C is a graph of a winding current during space a vector pulse width modulation control routine according to the teachings of the present disclosure.

At 312, the controller 60 obtains a plurality of instantaneous phase current decay samples (e.g., instantaneous phase current decay samples 362 and 364, instantaneous phase current decay samples 372, 374, and/or instantaneous phase current decay samples 382, 384 of current plot 360 shown in FIG. 3C). At 316, the controller 60 determines the decay time constant of the windings 12 based on the plurality of instantaneous phase current decay samples. At 320, the controller 60 determines the resistance and/or temperature of the windings 12 based on the decay time constant.

It should be understood that routines similar to routine 300 may be performed to determine the resistance of the winding 12 during a nonzero-vector state in other variations. As an example, if the SVPWM routine (or other control routine of the AC electric machine 10) is not in the zero-vector state, the controller 60 may obtain a plurality of instantaneous phase current rise samples (e.g., instantaneous phase current samples in one of periods (1, 0, 0) or (1, 1, 0) shown in FIG. 3C). Subsequently, the controller 60 may determine the rise time constant of the windings 12 based on the plurality of instantaneous phase current decay samples and determine the resistance and/or temperature of the windings 12 based on the rise time constant.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
    determining a vector state of an alternating current (AC) electrical machine;
    when the vector state is a zero-vector state:
        obtaining a plurality of phase current samples of the AC electrical machine;
        determining a decay time constant based on the plurality of phase current samples; and
        determining a resistance of a winding of the AC electrical machine based on the decay time constant; and
    selectively activating a plurality of switches of an inverter configured to provide power to the AC electrical machine based at least on the resistance of the winding of the AC electrical machine.

2. The method of claim 1, wherein the vector state is determined based on a plurality of switches of the inverter.

3. The method of claim 2, wherein the vector state is the zero-vector state when each of the plurality of switches and a power supply collectively form a short circuit.

4. The method of claim 2, wherein the vector state is the zero-vector state when the AC electrical machine operates at a steady state stall condition.

5. The method of claim 1 further comprising controlling the AC electrical machine based on a space vector pulse width modulation routine.

6. The method of claim 1, wherein the decay time constant is determined based on a first current magnitude of a first phase current sample of the plurality of phase current samples and a second current magnitude of a second phase current sample of the plurality of phase current samples.

7. The method of claim 6, wherein the decay time constant is determined based on a difference between a first natural log of the first current magnitude and a second natural log of the second current magnitude.

8. The method of claim 1, wherein the decay time constant is determined based on a first timestamp of a first phase current sample of the plurality of phase current samples and a second timestamp of a second phase current sample of the plurality of phase current samples.

9. The method of claim 8, wherein the decay time constant is determined based on a difference between the first timestamp and the second timestamp.

10. The method of claim 1, wherein the resistance is determined based on a baseline inductance of the winding.

11. The method of claim 1 further comprising determining a temperature of the winding based on the resistance.

12. The method of claim 11, wherein the temperature is determined based on a baseline resistance of the winding and a temperature coefficient of resistance of the winding.

13. A system comprising:
    a processor; and
    a nontransitory computer-readable medium including instructions that are executable by the processor, wherein the instructions include:
        determining a vector state of an alternating current (AC) electrical machine;
        when the vector state is a zero-vector state:
            obtaining a plurality of phase current samples of the AC electrical machine;
            determining a decay time constant based on the plurality of phase current samples; and
            determining a resistance of a winding of the AC electrical machine based on the decay time constant; and
        selectively controlling a plurality of switches of an inverter configured to provide power to the AC electrical machine based at least on the resistance of the winding of the AC electrical machine.

14. The system of claim 13, wherein the vector state is determined based on a plurality of switches of an inverter communicably coupled to the processor.

15. The system of claim 14, wherein the vector state is the zero-vector state when each of the plurality of switches and a power supply collectively form a short circuit.

16. The system of claim 14, wherein the vector state is the zero-vector state when the AC electrical machine operates at a steady state stall condition.

17. The system of claim 13, wherein the decay time constant is determined based on a first current magnitude of a first phase current sample of the plurality of phase current samples and a second current magnitude of a second phase current sample of the plurality of phase current samples.

18. The system of claim 17, wherein the decay time constant is determined based on a first timestamp of the first phase current sample and a second timestamp of the second phase current sample.

19. The system of claim 18, wherein the decay time constant is determined based on:
    a difference between a first natural log of the first current magnitude and a second natural log of the second current magnitude; and
    a difference between the first timestamp and the second timestamp.

20. A method comprising:
   determining a vector state of an alternating current (AC) electrical machine, wherein the vector state is one of a zero-vector state and a nonzero-vector state;
   when the vector state is in the nonzero-vector state:
      obtaining a plurality of phase current samples of the AC electrical machine;
      determining a rise time constant based on the plurality of phase current samples; and
      determining a resistance of a winding of the AC electrical machine based on the rise time constant; and
   selectively activating a plurality of switches of an inverter configured to provide power to the AC electrical machine based at least on the resistance of the winding of the AC electrical machine.

* * * * *